United States Patent [19]

Ashenfelder, Jr.

[11] Patent Number: 4,962,937

[45] Date of Patent: Oct. 16, 1990

[54] APPARATUS FOR DEFLECTING FLUIDS LEAKING AROUND PUMP SHAFTS

[76] Inventor: Jack E. Ashenfelder, Jr., 10810 Longren, Houston, Tex. 77089

[21] Appl. No.: 326,329

[22] Filed: Mar. 21, 1989

[51] Int. Cl.⁵ .................... B65D 53/00; F16J 15/40; B64C 11/16
[52] U.S. Cl. .................... 277/68; 277/133; 277/134; 384/135; 416/236 A
[58] Field of Search .................... 277/17, 19, 67, 68, 277/133, 199, 134; 384/135, 472, 478; 415/168.1, 168.2, 169.1; 416/174, 179, 180, 236 A

[56] References Cited

U.S. PATENT DOCUMENTS

| | | | |
|---|---|---|---|
| 147,722 | 2/1874 | Whitaker | 277/133 |
| 1,945,219 | 1/1934 | Fruhstorfer | 277/133 X |
| 1,962,380 | 6/1934 | Biggs | 277/67 X |
| 2,004,440 | 6/1935 | Kazenmaier | 277/67 |
| 2,350,448 | 6/1944 | Collins | 277/133 X |
| 2,636,788 | 4/1953 | Van Ness | 277/133 X |
| 2,829,932 | 4/1958 | Werner | 384/135 |
| 3,379,444 | 4/1968 | Brummer et al. | 277/199 X |
| 3,384,026 | 5/1968 | Williamson | 415/143 |

FOREIGN PATENT DOCUMENTS

| | | | |
|---|---|---|---|
| 652743 | 5/1929 | France | 277/67 |
| 714045 | 8/1954 | United Kingdom | 277/68 |

Primary Examiner—Allan N. Shoap
Assistant Examiner—Scott Cummings
Attorney, Agent, or Firm—E. R. Archambeau, Jr.

[57] ABSTRACT

In the representative embodiment of the apparatus of the invention disclosed herein, a circular fluid deflector with a central opening to receive a pump shaft is arranged with a flat transverse face for facing the seal in the pump housing through which the shaft is extended. Fluid-deflecting surfaces are arranged on the deflector including a peripheral rim having an outwardly-diverging inclined surface and one or more annular ribs coaxially disposed between the central opening and the rim which respectively have surfaces facing the shaft seal so that whenever fluids leaking through the shaft seal strike any of these fluid-deflecting surfaces these fluids will be directed outwardly from the deflector member to provide a fluid screen to divert other leaking fluids that would otherwise pass around the deflector and contact adjacent equipment such as the prime mover for the pump.

20 Claims, 2 Drawing Sheets

APPARATUS FOR DEFLECTING FLUIDS LEAKING AROUND PUMP SHAFTS

BACKGROUND OF THE INVENTION

Those skilled in the art will, of course, appreciate that a typical centrifugal pump includes a vaned impeller which is disposed within a suitable enclosed housing and cooperatively arranged on one end of a rotatable driving shaft that is coupled to a prime mover such as an electric motor located outside of the pump housing. The mid-portion of the shaft is extended through an opening in the pump housing and cooperatively journalled in a bearing assembly that is either mounted in the opening or in a separate housing immediately adjacent thereto. Inasmuch as the interior of the pump housing will be at an elevated pressure, a typical centrifugal pump also includes shaft-sealing means such as a so-called "stuffing box" or "packing gland" that is arranged around the opening in the pump housing and provided with one or more annular sealing members that are cooperatively engaged with the mid-portion of the shaft for hopefully preventing leakage of the pressured fluid around the rotating shaft.

Sooner or later such shaft seals will deteriorate, if not fail altogether; and, when this occurs, a highly-pressured leaking fluid will be discharged with considerable force through the clearance space around the rotating shaft. Ordinarily this will allow the leaking fluid to enter an outboard bearing as well as to contact the prime mover driving the pump. The severity of any damage caused by leakage such as this will, of course, be determined by the chemical nature of the leaking fluid. Thus, if the fluid is a corrosive substance such as an acid, a caustic or salt water, nearby equipment such as the prime mover or outboard bearings may be severely damaged or ruined unless the leakage is controlled. It will be recognized that in many instances, the replacement of the faulty sealing member will require the removal of the prime mover to gain access to the stuffing box. Thus, in addition to the time lost while the pump is out of service, even a simple replacement operation will entail considerable expense as well as require the services of skilled workmen should heavy-duty equipment be required to remove the prime mover.

Accordingly, in many situations, the common practice is to tolerate a limited amount of leakage though the packing gland and to minimize the leakage as long as it is reasonably possible by periodically tightening the packing gland. Thus, to minimize the damage that would otherwise be caused by leaking fluids, it has been a common practice heretofore to mount a flat disc or socalled "slinger ring" or "slinger" at some convenient location on the pump shaft between the pump packing gland and an outboard bearing assembly or the prime mover for the pump. In this way, as fluids leaking through the packing gland move longitudinally along the rotating shaft, they will be blocked by the slinger; and, by virtue of centrifugal force, once the fluids reach the slinger they will be slung radially outwardly in a transverse plane that lies substantially perpendicular to the axis of the pump shaft. As depicted in U.S. Pat. No. 2,248,505, for example, a slinger may also be retained on the pump shaft by a resilient collar which is tightly engaged over the shaft to block leakage past the collar as well as to facilitate the installation and removal of the slinger.

In most instances it has been found that a simple disc-like slinger is incapable of handling a large quantity of fluids leaking from a packing gland. For example, as disclosed in U.S. Pat. No. 4,181,312, a slinger ring may be shaped to define a plurality of outwardly-converging radial vanes that are separated from one another by a corresponding number of flat surfaces which are arranged to direct leaking fluids outwardly along the edges of the vanes toward the tips of the vanes and thereby concentrate the fluids near the rim of the disc where they are then propelled radially outwardly by the vanes. As described in that patent, unless that slinger ring is positioned immediately adjacent to the outboard bearing housing or prime mover being protected, a strong spray of leakage fluids can still pass over the rim of the slinger and strike the bearing or prime mover. As described in French Pat. No. 653,743, issued to Dujardia & Co. and published on Mar. 12, 1929, another type of slinger considered heretofore is shaped like a shallow circular saucer having an uninterrupted concave surface. This saucer-like slinger is mounted on a pump shaft between the pump and its prime mover so that the concave surface of the slinger is facing the shaft packing gland of the pump. In this manner, should there be a leakage of pressured fluids from the packing gland the fluids will strike the concave surface and be diverted outwardly and away from the prime mover.

OBJECTS OF THE INVENTION

Accordingly, it is an object of the present invention to provide new and improved pump slingers for deflecting fluids that are leaking from a shaft seal away from nearby equipment.

It is a further object of the invention to provide new and improved fluid deflectors that can be readily mounted on a pump shaft adjacent to a packing gland for deflecting fluids that are discharged through the packing gland.

SUMMARY OF THE INVENTION

These and other objects of the present invention are attained by new and improved apparatus which is adapted to be mounted on a rotatable driving shaft extending from a shaft seal in a fluid pump handling pressured fluids. To prevent pressured fluids leaking though the seal from contacting other apparatus adjacent to the pump housing, the fluid-deflecting apparatus is arranged as a circular member that is adapted to be mounted on a pump shaft and rotated thereby in a plane that is substantially perpendicular to the longitudinal axis of the shaft for laterally deflecting the pressured leakage fluids that would otherwise impinge directly on the apparatus being protected.

The new and improved fluid-deflecting member of the present invention has a transverse face having multiple fluid-deflecting surfaces arranged to be faced toward the shaft seal of the pump. In the preferred embodiment of the present invention these several fluid-deflecting surfaces are defined by one or more intermediate annular projections that are concentrically arranged at spaced intervals along the transverse face between the central axis of the circular member and an inwardly-directed, outwardly-diverging inclined surface on the peripheral rim of the circular member. In this manner, as the new and improved fluid deflector of the present invention is rotated by the pump shaft, those pressured fluids exiting from the shaft seal and striking the intermediate portions of the transverse face of the deflector member will be directed outwardly along its transverse face to contact the fluid-deflecting surfaces of the annular projections and thereby divert that portion of the pressured leakage fluids outwardly away from the pump shaft. Similarly, those portions of the pressured leakage fluids striking the outer portions of the transverse surface beyond the intermediate projections will also be diverted outwardly by the inclined surface on the peripheral rim of the circular member. In this manner, the diverted fluid portions will form multiple outwardly-diverging, frustoconical fluid screens which will intersect the paths of other portions of the pressured fluids that would otherwise be passing around the perimeter of the circular member and contacting nearby equipment. These multiple outwardly-diverging fluid screens will, therefore, be effective for substantially, if not altogether, safeguarding nearby equipment from these pressured leakage fluids.

Mounting of the new and improved fluid deflector of the invention on a pump shaft is facilitated by at least partially dividing the circular member so that it may be readily separated, placed on a pump shaft, and firmly secured in a desired operating position on the pump shaft.

DETAILED DESCRIPTION OF THE INVENTION

Figure 1:
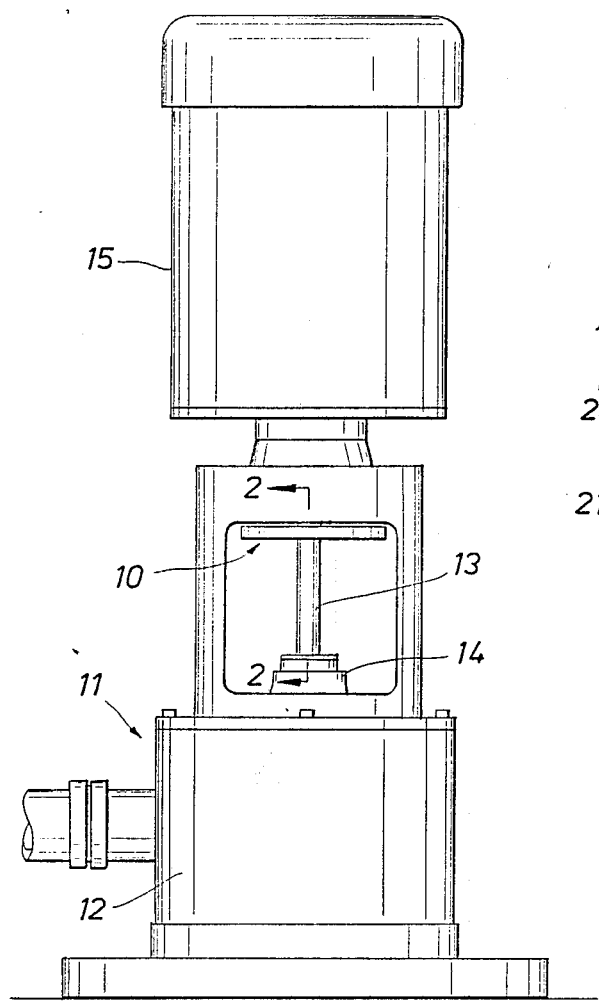
FIG. 1 shows a preferred embodiment of the fluiddeflecting apparatus of the present invention as it will appear when mounted on the shaft of a typical vertical pump.

Turning now to FIG. 1, a new and improved leakage-fluid deflector 10 arranged in accordance with the principles of the present invention is depicted as it will appear when mounted on a typical rotary pump shown generally at 11. As is usual, the pump 11 includes a fluid impeller (not seen in the drawings) that is cooperatively arranged within a pressure-tight housing 12 and supported for rotation therein on one end of an elongated shaft 13 that is rotatably journalled on one or more bearings (not seen in the drawings) and extended through a pressure-tight stuffing box or packing gland 14 mounted in one wall of the housing. The other end of the shaft 13 is coupled to a suitable prime mover such as an electric motor 15 mounted on the pump housing 12. It should, of course, be appreciated that although FIG. 1 shows a vertical pump, as at 11, the new and improved fluid deflector 10 of the present invention may be used with equal success without regard for the orientation of the pump.

Figure 2:
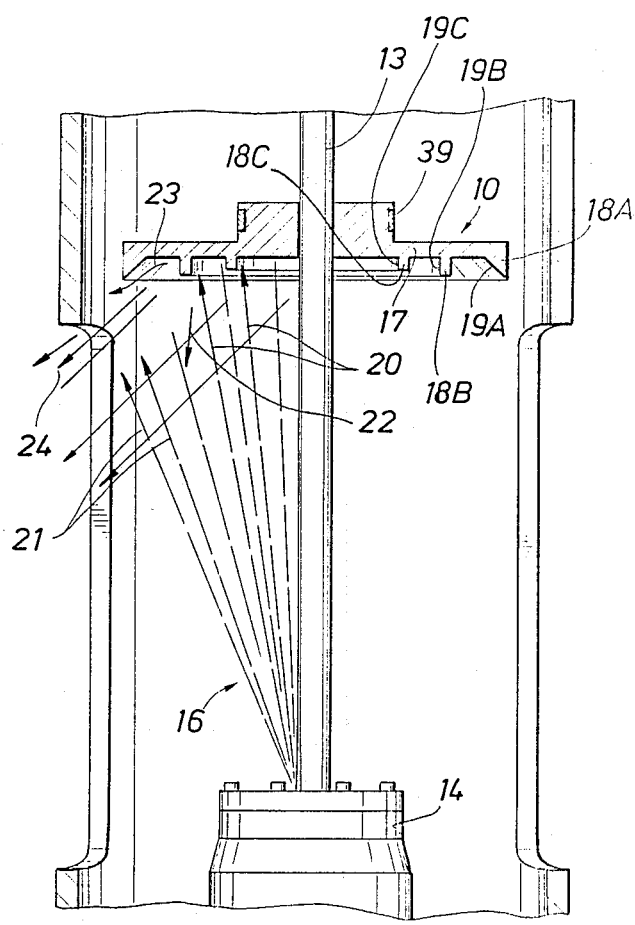
FIG. 2 is an enlarged, partially cross-sectioned view of the new and improved fluid-deflecting apparatus which is taken along the line "2—2" in FIG. 1 for schematically depicting the unique operation of the fluid-deflecting apparatus for deflecting fluids leaking around the pump shaft away from nearby equipment.

Turning now to FIG. 2, a partially cross-sectioned enlarged view is shown of the intermediate portion of the pump 11 so as to illustrate the unique arrangement of the leakage-fluid deflector 10 as well as to depict its operation in protecting adjacent equipment such as the electric motor 15 from a stream of pressured leakage fluids, such as shown generally at 16, that is escaping through a leakage passage that has developed between adjacent surfaces of the driving shaft 13 and its associated packing gland 14. As illustrated, the preferred embodiment of the fluid deflector 10 is arranged as a flat disc that includes a generally-flat central portion 17 and a peripheral or rim portion 18A which is uniquely shaped for defining an outwardly-diverging, inclined marginal surface 19A that will be positioned so as to be facing the packing gland 14. Although the fluid deflectors 10 of the present invention can be alternatively arranged so that the angle of inclination of the marginal edge surface 19A is somewhat less than or greater than the 45-degree angle illustrated in the drawings, tests have shown that an angle of about 45-degrees will give optimum results.

It will, of course, be recognized that a leakage fluid, such as at 16, can be discharged in any one or more unpredictable paths depending upon the physical condition of the seal such as the packing gland 14 around the shaft 13. For instance, a fluid may be leaking around the entire circumference of a packing gland in such a manner that it fans out in a generally-conical pattern. On the other hand, as illustrated in FIG. 2, a leakage path may develop on only one side of the packing gland 14 with the result that the leakage fluids, as at 16, may instead be concentrated on that side of the shaft 13 with one portion, as represented by the arrows 20, that is impinging directly against the central disc portion 17 and another portion, as shown by the arrows 21, that is sufficiently divergent from the longitudinal axis of the shaft that it would otherwise pass over the rim portion 18A of the disc 10 and strike the pump driving motor 15 (not seen in FIG. 2). The same problem will, of course, exist but with more severity if these leakage fluids 16 are instead issuing from several leakage paths that have developed between the shaft 13 and packing gland 14. It must also be recognized that the pattern of these various leakage streams will often unpredictably change as the leakage fluids 16 develop larger or additional leakage paths through the packing gland 14. In any event it will be recognized from the previous discussion that if damage to nearby equipment such as the motor 15 is to be avoided, it is the minor portion (such as the divergent concentrated streams represented by the arrows 21) of the leakage fluids 16 that have to be safely deflected to one side of the motor and other nearby equipment by the operation of the new and improved fluid deflector 10 of the present invention.

Accordingly, in keeping with the principles of the present invention, one or more intermediate deflectors, as at 18A and 18B, are each provided with inwardly-directed surfaces, as at 19B and 19C, and cooperatively arranged at intermediate locations around the lower face of the central portion 17 of the deflector 10. As is clearly depicted in FIGS. 2 and 4, in the preferred embodiment of the invention these intermediate deflectors 18B and 18C are arranged as concentric outstanding projections, with the outer intermediate deflector 18B having a greater height than the inner intermediate deflector 18C.

It will be recognized from FIG. 2 that as the leakage fluids 16 (represented by the arrows 20) hit the rotating fluid deflector 10, as represented by the various arrows 22A-22C major portions of the leakage fluids will be forcibly diverted toward the pump 11 while other portions of these fluids will be forcibly directed laterally outwardly along the irregular surface of the central portion 17 of the disc 10 that faces the packing gland 14. As depicted, one portion of the leakage fluids that contact the lower surface of the disc 10 closest to the pump shaft 13 will be carried along the lower suface until they contact the inwardly-directed surface 19C of the intermediate projection 18C. This will divert those particular fluids downardly and outwardly as indicated by the arrow 22C. In a similar fashion, another portion of the leakage fluids contacting the lower surface of the disc 10 lying between the two projections 18B and 18C will be carried outwardly along the lower surface until they engage the inwardly-directed surface 19B of the intermediate deflector 18B. Hereagain, as indicated by the arrow 22B, those particular fluids will be diverted downwardly by the surface 19B. Those leakage fluids that engage that portion of the rotating disc 10 between the projection 18B and the rim 18A will be carried outwardly toward the inclined surface 19A of the rim. Once this remaining portion of the leakage fluids 16 come to the inclined surface 19A (as schematically depicted by the arrow 23) those leakage fluids will also be forcibly directed downwardly along this outwardly-diverging surface to the outermost edge of the rim 18A where the centrifugal forces acting on those fluids will sling those fluids outwardly from the rim. In testing the depicted new and improved deflector 10, it appears that since the inclined surface 19A is deflecting these portions of the fluids outwardly as shown by the arrow 23 (and, where the deflector is mounted horizontally above a leaking seal, downwardly as well), the leakage fluids leaving the intermediate deflectors 18B and 18C and the rim 18A will define outwardly and downwardly-inclined screens, as at 24A-24C, of fluid that will intersect the other leakage fluids which are moving along the upwardly-directed paths as represented by the arrows 21. Thus, in operating the new and improved deflector 10, it has been found that the velocity of the leakage fluids that are traveling outwardly in these frustoconical envelopes 24A-24C will be sufficient to provide fluid screens which are sufficient to block most, if not all, of the leakage fluids that (as shown by the arrows 21) would otherwise pass around the disc 10 and strike the motor 15.

Figure 3:
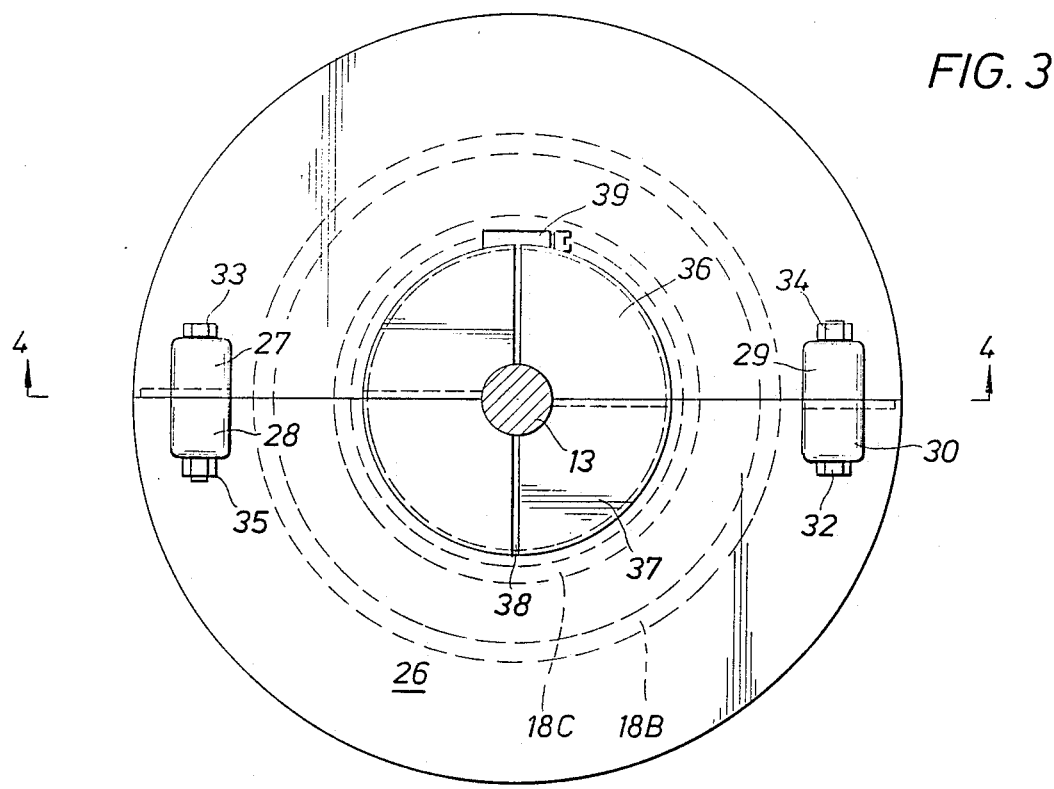
FIG. 3 is a plan view of the deflecting apparatus showing a preferred mounting arrangement.
Figure 4:
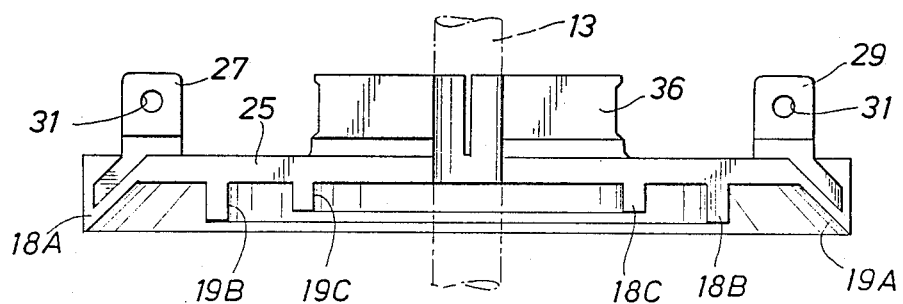
FIG. 4 is an elevational view of the fluid-deflecting apparatus taken along the line "4—4" in FIG. 3.
Figure 5:
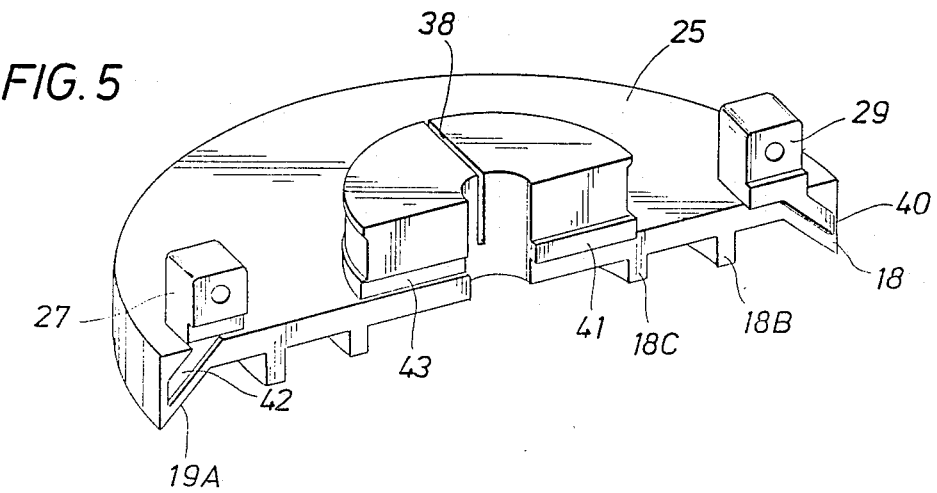
FIG. 5 is an isometric elevational view of that portion of the apparatus shown in FIG. 4 illustrating various constructional details of the apparatus of the invention.

Turning now to FIGS. 3-5, various views are shown of a preferred embodiment of the new and improved fluid deflector 10 of the present invention. As depicted by these several views, to facilitate the installation of the deflector 10 it is formed in two or more segments that are cooperatively arranged so that they can be respectively positioned on opposite sides of a pump shaft and secured together whenever the deflector is assembled. Those skilled in the art will appreciate, of course, that by forming the deflector 10 as identical separate halves 25 and 26, both the manufacture and installation of the deflector will be greatly simplified. In a preferred arrangement to secure the two halves 25 and 26 into a unitary assembly around a pump shaft, as at 13, laterally-spaced, upstanding bosses 27-30 are arranged on the planar surface of the deflector 10 that will be facing away from any leakage fluids that may be discharged through the associated packing gland. The bosses 27-30 are respectively drilled, as at 31, for receiving matched sets of bolts and nuts, as at 32-35, and arranged so that as the nuts are tightened the two halves 25 and 26 will be pulled together until the opposed edges of the two halves and the mating faces of the bosses are pulled together for firmly securing the two halves on opposite sides of the shaft 13. As an additional precaution to retain the deflector 10 on the shaft 13, matched semi-circular bosses 36 and 37 are respectively arranged on each of the two halves 25 and 26 for cooperatively defining an axial hub that will be coaxially disposed around the shaft 13 when the two halves are assembled. Transverse grooves, as at 37 and 38, are provided in the bosses 36 and 37 so that once the two halves 25 and 26 are positioned around the shaft 13, a metal band or screw clamp, as at 39, can be tightened around the two bosses for firmly clamping the assembled fluid deflector 10 around the pump shaft.

It will, of course, be appreciated that the opposing edges of the two halves 25 and 26 can just as well be flat planar surfaces and these opposing edges will be satisfactorily abutted with one another as the bolts and nuts 32-35 and the metal band 39 are tightened. Nevertheless, as an additional aspect of the present invention, since it is preferred that the two halves 25 and 26 remain perfectly aligned with one another, alignment means are provided on the two halves for cooperatively retaining the two halves in transverse alignment. As best seen in FIG. 5, this transverse alignment is preferably accomplished by arranging one or more transverse projections and complementary grooves, as at 40-43, on the abutting edges of the two halves 25 and 26. As one means of simplifying the fabrication of the two halves 25 and 26, it will be appreciated from FIG. 5 that each of the two halves have the projections or tongues 40 and 41 located on one side of each of the two halves and the matching grooves 42 and 43 located on the other side of each of the two halves. By forming the two halves 25 and 26 as identical members, it will be seen that only a single mold is needed to fabricate the deflector 10 and there is no need to store the two halves in separate places which would be the case if the two halves were instead formed as individual or distinctive components. Those skilled in the art will, of course, recognize that the material used for the fluid deflector 10 will depend upon the nature of the leakage fluids. It is always possible to machine the fluid deflector 10 from any one of several suitable corrosion-resistant metals, plastics or ceramics. However, since it is more economical to manufacture the deflector by typical injection-molding techniques, it has been found more advantageous to usually form the deflector from a thermoplastic such as PVC or other corrosion-resistant plastic.

Accordingly, it will be appreciated that the present invention has provided new and improved fluid deflectors which are cooperatively arranged to be easily positioned around a pump shaft and secured thereon for effectively preventing fluids that may subsequently leak through the shaft seal from contacting any nearby equipment. By arranging the deflectors of the invention with an outwardly-diverging peripheral surface that is adapted to be faced toward the pump shaft seal, fluids leaking from the seal and striking the fluid deflector will be forcibly directed away from the peripheral surface so as to define a fluid screen that will intersect and deflect other fluids that are leaking from the seal and would otherwise pass around the deflector and contact nearby equipment such as the prime mover for the pump.

While only a particular embodiment of the apparatus of the present invention has been shown and described herein, it is apparent that various changes and modifications may be made to the apparatus without departing from the broader aspects of this invention; and, therefore, the aim in the appended claims is to cover all such changes and modifications as fall within the true spirit and scope of this invention.

What is claimed is:

1. A fluid deflector to be mounted on the driving shaft of a rotating pump for laterally deflecting fluids leaking from the shaft seal of that pump and comprising:
   a circular member having a central opening therein for receiving a pump shaft;
   means on said circular member for deflecting fluids leaking through a shaft seal and including a transverse fluid-deflecting surface on said circular member coaxially disposed around said central opening and extending laterally outwardly therefrom so as to be contacted by such leakage fluids, a peripheral rim on said circular member arranged to define an outwardly-diverging fluid-deflecting surface coaxially disposed around said transverse surface so as to be contacted by such leakage fluids, and at least one outstanding projection coaxially disposed around said central opening and arranged on said transverse surface between said central opening and said rim for defining a concentric intermediate fluid-deflecting surface surrounding and facing said central opening and spatially disposed therearound at a uniform radius, said fluid-deflecting surfaces being cooperatively arranged to respectively divert leakage fluids that contact said fluid-deflecting surfaces laterally outwardly to form frustoconical envelopes of the diverted fluids for forcibly intercepting other leakage fluids moving along paths extending outside of said peripheral rim; and
   means on said circular member for securing said circular member on a pump shaft disposed within said central opening.

2. The fluid deflector of claim 1 wherein said circular member includes at least two portions adapted to be moved apart for positioning a pump shaft in said central opening; and further including means for securing said two portions together to retain said fluid deflector on the pump shaft.

3. The fluid deflector of claim 1 wherein said outstanding projection is a continuous annular projection so that said intermediate fluid-deflecting surface defines a continuous uninterrupted surface facing said central opening.

4. The fluid deflector of claim 1 wherein said fluid-deflecting surface on said peripheral rim is inclined at an angle between 30-degrees and 60-degrees with respect to the longitudinal axis of said central opening.

5. The fluid deflector of claim 1 wherein said transverse surface is substantially flat and lies in a plane perpendicular to the longitudinal axis of said central opening.

6. A fluid deflector to be mounted on the driving shaft of a rotating pump adjacent to its shaft seal for laterally deflecting fluids leaking therefrom and comprising:
   a circular disc member having a central opening for receiving the driving shaft of a pump and a transverse surface surrounding said central opening and perpendicular to its longitudinal axis which is to be faced toward the shaft seal;
   means on said disc member for diverting leakage fluids striking said disc member including intermediate fluid-deflecting means coaxially disposed at a uniform radius around said central opening on said transverse surface, and outer fluid-deflecting means coaxially disposed about the perimeter of said transverse surface, said intermediate and outer fluid-deflecting means respectively defining concentric intermediate and outer fluid-deflecting surfaces surrounding and facing said central opening and located at a uniform radius therefrom for diverting leakage fluids striking said transverse surface laterally outwardly and at an angle away from the rotational plane of said transverse surface to form a frustoconical screen of the diverted leakage fluids to forcibly intercept leakage fluids moving along paths extending outside of said perimeter of said transverse surface; and
   means for securing said disc member on the driving shaft of a rotating pump.

7. The fluid deflector of claim 6 wherein said disc member is comprised of at least two portions adapted to be separated for disposing a pump driving shaft in said central opening; and means for securing said two portions together around the pump shaft.

8. The fluid deflector of claim 6 wherein said intermediate fluid deflecting means include first and second outstanding projections spatially disposed at an equal distance from one another on said transverse surface between said central opening and said outer fluid-deflecting means and coaxially arranged around the central axis of said central opening for defining concentric first and second intermediate fluid-deflecting surfaces with each of said fluid-deflecting surfaces being at a uniform radius from said central opening.

9. The fluid deflector of claim 8 wherein said first and second outstanding projections are of unequal heights.

10. The fluid deflector of claim 8 wherein said first and second outstanding projections are continuous so that said first and second intermediate fluid-deflecting surfaces are uninterrupted.

11. The fluid deflector of claim 6 wherein said outer fluid-deflecting means include a continuous peripheral rim around said circular disc member so that said outer fluid-deflecting surface is uninterrupted.

12. The fluid deflector of claim 11 wherein said first and second outstanding projections are continuous so that said first and second intermediate fluid-deflecting surfaces are uninterrupted.

13. The fluid deflector of claim 11 wherein said outer fluid-deflecting surface is inclined at an angle between 30-degrees and 60-degrees with respect to said longitudinal axis.

14. The fluid deflector of claim 11 wherein said transverse surface is substantially flat and lies in a plane perpendicular to the longitudinal axis of said central opening.

15. A fluid deflector for mounting on the driving shaft of a rotating pump adjacent to its shaft seal and cooperatively arranged for laterally deflecting fluids leaking therefrom and comprising:
   a circular member having a central opening for receiving a pump-driving shaft and a generally-flat transverse face uniformly disposed around said central opening in a plane substantially perpendicular to the longitudinal axis of said central opening and arranged to be faced toward the shaft seal around the pump-driving shaft;
   means on said circular member for deflecting fluids leaking from the shaft seal and striking said transverse face including an outstanding rim around said circular member having an inclined, outwardly-diverging peripheral fluid-deflecting surface facing said central opening, and concentric first and second outstanding projections coaxially arranged around said longitudinal axis and respectively spatially disposed at a first radius and a second radius between said outstanding rim and said central opening for respectively defining concentric first and second intermediate fluid-deflecting surfaces equally spaced from one another and facing said central opening so that said each of said fluid-deflecting surfaces divert the leakage fluids striking said transverse face outwardly from said circular member to forcibly intercept other leakage fluids moving outside of said circular member; and means cooperatively arranged for securing said circular member on a pump-driving shaft disposed in said central opening.

16. The fluid deflector of claim 15 wherein said peripheral fluid deflecting surface is inclined at an angle between 30-degrees and 60-degrees with respect to said longitudinal axis.

17. The fluid deflector of claim 1k wherein said peripheral fluid deflecting surface is inclined at an angle of about 45-degrees with respect to said longitudinal axis.

18. The fluid deflector of claim 15 wherein said circular member is comprised of at least two individual sectorial portions to be assembled around a pump-driving shaft; and further including means cooperatively arranged on said circular member for securing said sectorial portions into a unitary assembly around the pump-driving shaft.

19. The fluid deflector of claim 18 further including mating male and female elements cooperatively arranged on the abutting edges of said sectorial portions for positioning each of said sectorial portions in a common transverse plane; and means cooperatively arranged on the opposite sides of said sectorial portions from said transverse face for securing said sectorial portions into a unitary assembly around the pump-driving shaft.

20. The fluid deflector of claim 15 wherein said circular member is formed of a material that is corrosion resistant with respect to the fluids leaking from the shaft seal.

* * * * *